March 10, 1931.    J. W. EKSTEDT    1,795,767
MACHINE FOR PRODUCING COILED BODIES
Filed Oct. 20, 1926    5 Sheets-Sheet 1

INVENTOR
John W. Ekstedt
BY

ATTORNEY

March 10, 1931. J. W. EKSTEDT 1,795,767
MACHINE FOR PRODUCING COILED BODIES
Filed Oct. 20, 1926   5 Sheets-Sheet 3

INVENTOR
John W. Ekstedt
BY
ATTORNEY

INVENTOR
John W. Ekstedt
BY
ATTORNEY

Patented Mar. 10, 1931

1,795,767

UNITED STATES PATENT OFFICE

JOHN W. EKSTEDT, OF BELLEVILLE, NEW JERSEY, ASSIGNOR TO WESTINGHOUSE LAMP COMPANY, A CORPORATION OF PENNSYLVANIA

MACHINE FOR PRODUCING COILED BODIES

Application filed October 20, 1926. Serial No. 142,823.

This invention relates to a machine for the production of fine coiled filamentary bodies and relates more particularly to an apparatus for controlling the diameter and pitch of a helically coiled wire. As disclosed in Patent No. 1,670,499, dated May 22, 1928, a machine is provided by means of which a fine filament wire may be coiled without the aid of a mandrel. This machine includes a mechanism for moving a wire through a given path by tangential contact with a pair of oppositely disposed driving rollers and into a cavity die.

The die is so arranged that the cavity thereof is positioned to receive the wire; the bottom of the cavity being inclined or curved so that the wire is bent to produce a succession of convolutions which pass over a lip or spacer edge of the die. The helix or successive convolutions which issue from the die are consequently spaced a given distance apart and a helix is, therefore, provided of a definite diameter and pitch depending upon the dimension of the spacer member and the radius of curvature of the effective surface of the cavity.

In addition to the formation of the coil, the machine provides means for operating a cutter to sever a given section of the coiled wire and also means for controlling the amount or length of wire in each severed section so that when making a coiled filamentary body such as may be used as a light source in an incandescent electric lamp each section will contain a uniform length of wire so as to produce a filament of a given electrical resistance.

In the manufacture of coiled lamp filaments great accuracy is required in the formation of the filaments and each filament must be made according to specified dimensions with respect to the length of wire contained in a coiled section, the diameter of the coil and the spacing or pitch of the convolutions of the coil. This data is applicable to and is different with lamps of varying wattage and is known as the "rating". For example, a filament for a 60 watt, 115 volt lamp must contain a length of wire of 517 mm., it must have a diameter of .0108 inches, and the coiled section must contain 398 turns or convolutions per inch. The diameter of the wire also varies in filaments for different wattage lamps and that from which the coiled filament for a 60 watt lamp is formed is preferably .00187 inches in diameter.

In order to meet the above condition it is necessary to provide a machine in which an accurate co-relation between the wire driving mechanism and the coil winding mechanism is attainable. Furthermore, it is not only necessary to provide a machine in which the various elements may be held in definite exact relation but one which may be sufficiently flexible to permit a multiple or universal adjustment of the elements to an exceedingly fine degree for retention in fixed relation during the operation of the machine.

In the formation of a coiled filamentary body it has been found that considerable variation in the dimensions of the resultant coil is possible by a manipulation or adjustment of the die with respect to the path of movement of the wire during its travel into the die.

If it is desired, therefore, to produce a coiled section of wire such as a lamp filament having a predetermined pitch and diameter, the wire bending die may be adjusted so that the cavity thereof will be disposed in proper relation to the path of movement of the wire.

By reason of the present invention the various elements may be properly disposed and held in fixed relation to each other so that all coils produced with a given setting will have a predetermined diameter and pitch.

The present machine not only operates to coil the extremely fine diameter wire employed in the manufacture of a lamp filament or light source and with the degree of accuracy required in the formation of such coiled body but attains this accuracy at the high rate of speed at which the filament must be produced.

An object of the present invention is, therefore, to provide a machine for winding a coiled filamentary body in the absence of a mandrel so as to produce a helix of a given diameter and pitch in accordance with a given setting of the coil winding element and in varying such setting to change the diameter and pitch of the helix produced and in providing a machine for practicing such method.

The present machine includes the various elements as set forth above and embodied in the said copending application. The various features which make it possible to practice the present method are, however, more clearly set forth herein.

The present construction more clearly shows the various adjustment features such as the compound or universal support for the die. Means are also shown for obtaining a fine degree of adjustment between the driving rollers which propel the wire into the die.

The mechanism for adjustably holding the die includes first; means for permitting a reciprocable movement of the die to and from the wire driving rollers; second, an adjustable holder for the die to permit a vertical and horizontal movement thereof; third, means for permitting a manual movement of the die to an exceedingly slight degree to obtain a proper disposition thereof with respect to the wire driving means to produce a coiling operation that will give a helix of such dimensions as to answer the requirements of a lamp filament of a given rating.

Other mechanism is also shown such as means for cutting a coiled section having a predetermined length of wire therein and means for initially applying the wire to the die.

Other features and advantages will be more fully set forth as the description proceeds and the invention will be more clearly understood by reference to the accompanying drawings in which:

Figs. 12 to 20 show a diagrammatic representation of the relation of the die to the path of movement of the wire during the coiling operation and illustrates the method of attaining a variation in the diameter and pitch of the formed helix.

Referring now to the machine, the same may comprise a suitable base 20 upon which are mounted various co-related mechanisms consisting of a motor 21, a gear box 22, a measuring device 23 and a coil winding head 24.

Figure 3:
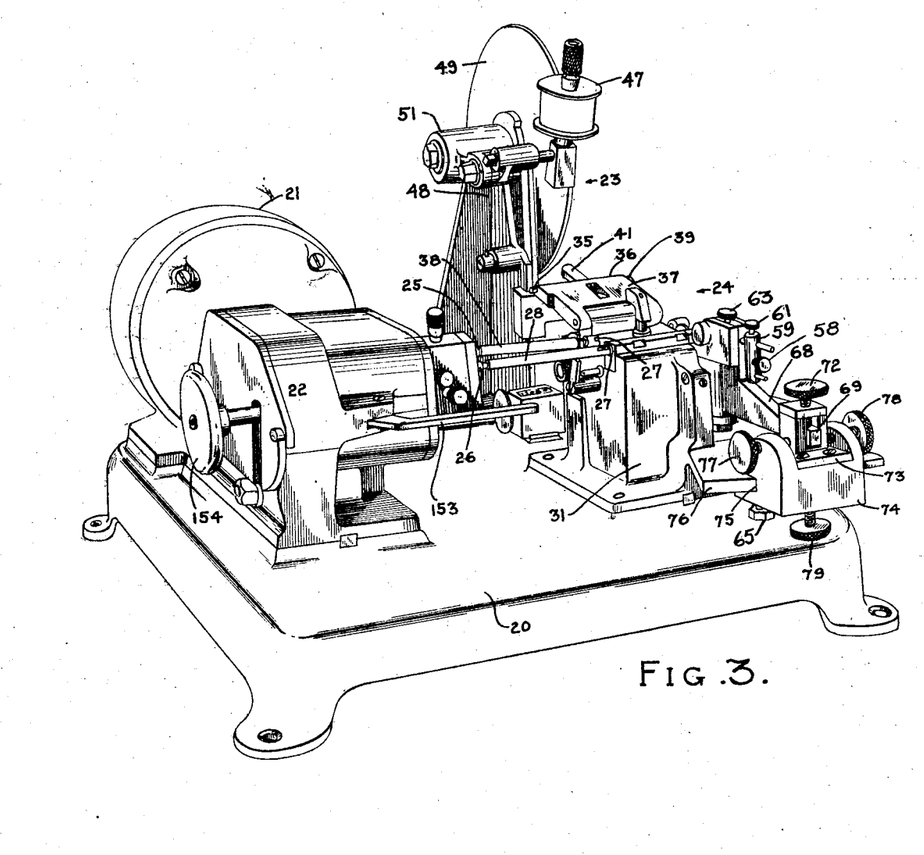
Fig. 3 is a perspective view showing the complete machine.
Figures 4, 5:
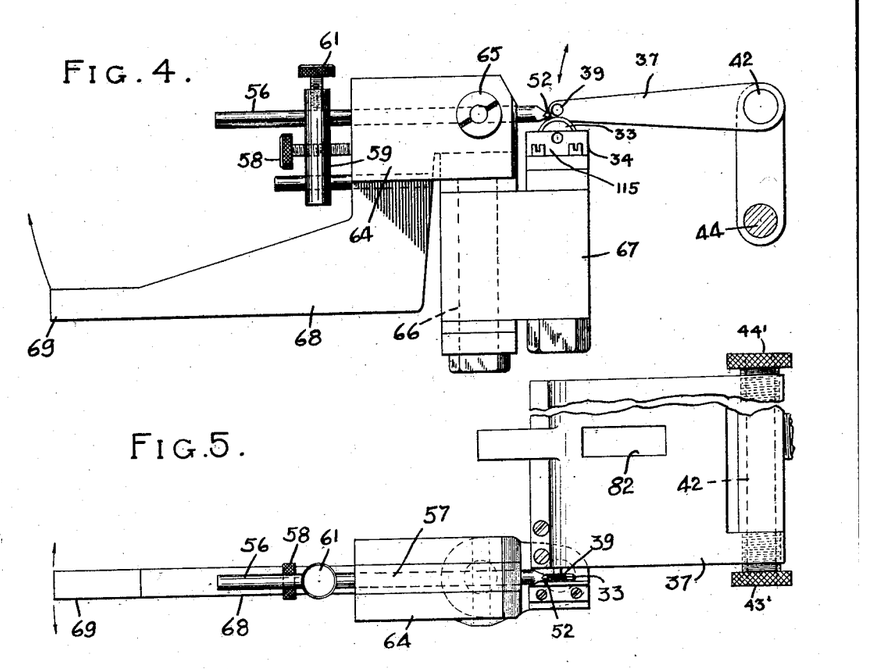
Fig. 4 is a side elevational detail view of the die holding mechanism and illustrates the adjustability thereof with respect to a pair of wire driving rollers.
Fig. 5 is a plan view of the elements shown in Fig. 4.
Figure 6:
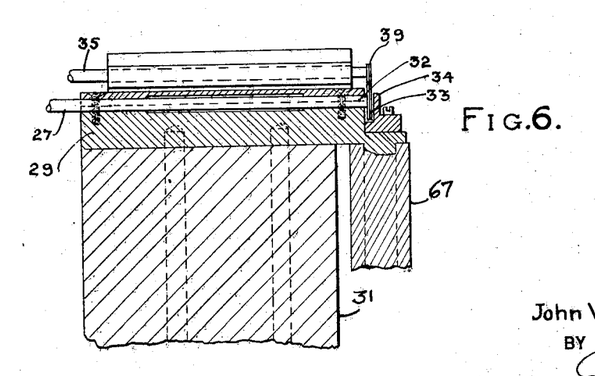
Fig. 6 is a sectional view of a portion of the machine and shows the driving rollers in their respective bearings, the bearing of the lower roller being shown in section.

The motor 21 may be connected by a suitable shaft with any standard reduction gear in the gear box 22, which mechanism may be adapted to rotate a pair of driving shafts 25 and 26 in opposite directions. The shaft 26 is connected to a shaft 27 (see Fig. 3) by a coupling member 28. The shaft 27 is mounted in a bearing 29 secured to a casing 31 suitably fastened to the base 20. An end 32 of the shaft 27 is provided with a grooved roller 33, the roller being held from outward endwise movement with the shaft by a suitably positioned stop plate 34 (see Fig. 4).

The shaft 25 is connectable to a shaft 35 (Fig. 3) mounted in a bearing 36 along one edge of a hinged bearing plate 37. Connection between the shaft 35 and the shaft 25 may consist of coupling member 38, the construction and operation of which will be presently described. At one end of shaft 35 is provided a grooved roller 39 of a lesser diameter than the roller 33. These rollers when positioned in opposite relation constitute means for driving a wire through a given path.

When the bearing-plate 37 is in its closed position the rollers 39 and 33 will be disposed with their longitudinal axes in substantially the same vertical plane thus positioning the rollers for engagement with the opposite sides of a filamentary wire 41 to be driven by a rotation of the rollers.

Figure 2:
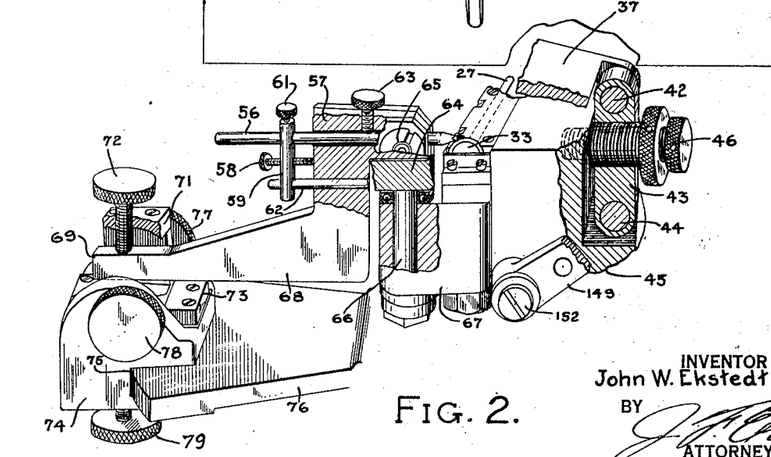
Fig. 2 is a fragmentary perspective detail view partly in section to show the operative elements of the machine.

The grooves in the rollers may be of a combined diameter less than the diameter of the wire to be driven, thereby permitting a firm frictional engagement between the rollers and the wire. It is important to have the rollers engage with the wire at exactly opposite sides therof and in order to insure for such engagement the bearing plate 37 is pivoted upon a pin 42 (see Fig. 2) at one end of a plate 43 which in turn is pivoted on a pin 44 secured in a supporting bracket 45. The plate 43 may, therefore, be rocked about the pin 44 and a set screw 46 is provided to permit adjustment; the set screw being adapted for threaded engagement with the bracket so as to hold the plate 43 in a fixed adjusted position. A slight sidewise movement of the bearing plate may be had by a manipulation of lateral adjustment screws 43' and 44' (see Fig. 5). The adjustment necessary is very slight and depends upon the play or looseness of the set screw 46 in its threaded aperture in the bracket 45. It will be evident, therefore, that the roller 39 which is mounted at the end of the bearing plate 37 may be adjusted to a fine degree with respect to the roller 33.

The filament wire to be coiled may be wound on a spool 47 mounted on a bearing bracket 48 (Fig. 3) suitably secured to the base 20 of the machine, the wire may be led around a measuring roller 49 mounted on a shaft rotatable in a bearing 51. The roller 49 may have a diameter equal to a given length of filament wire to be coiled and upon a complete rotation of the measuring roller a cutter is actuated in a manner to be hereinafter more fully described and a coiled section of the filament is severed.

Figures 18, 19, 20, 21, 22, 23, 24:
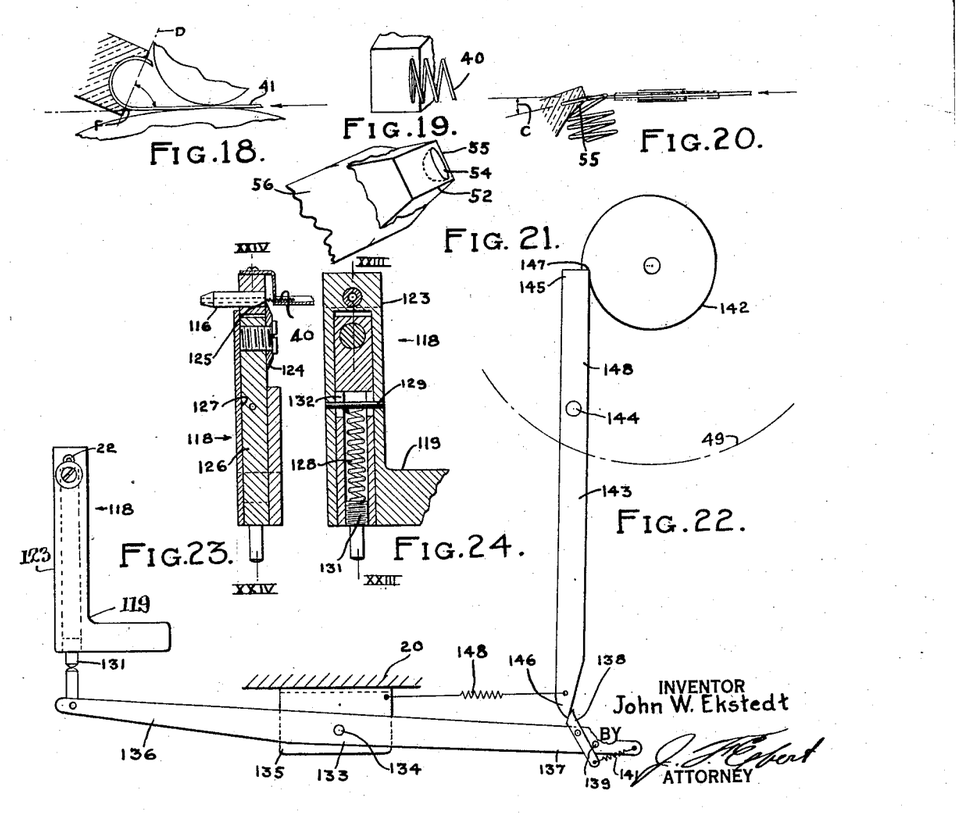
Fig. 18 shows the relation of the die to the path of movement of the wire to produce convolutions of lesser diameter than normally produced by the die.
Fig. 19 is a front view of the die and shows the same tilted to produce a greater spaced relation between the convolutions than normally produced by the die.
Fig. 20 is a sectional view of the die shown in Fig. 19.
Fig. 21 is a perspective view of the die mounted in a die rod.
Fig. 22 shows the various elements comprising the mechanism for performing the operation of severing the coiled filament.
Fig. 23 is a sectional view taken on line XXIII—XXIII in Fig. 24.
Fig. 24 is a sectional view of the cutter taken on line XXIV—XXIV in Fig. 23.

The wire, when gripped by the driving rollers 33 and 39, is driven tangentially therefrom and directly into a die 52. This die as shown in Fig. 21 and clearly described in the above patent consists of a block preferably a diamond in which a cavity 54 is provided. The cavity is disposed adjacent to an edge 55 of the block so that the said edge constitutes a lip or separator member for normally spacing the convolutions of a helix formed by the die which is usually mounted at an end of a die rod 56. For the purpose of positioning the die 52 in proper relation to the driving rollers 33 and 39 the die rod 56 is slidably mounted in a die holder 57 (see Figs. 1 and 2).

A horizontal reciprocal adjustment of the die rod in the holder 57 is attained by means of a set screw 58 which passes through a cross bar 59 which may be secured to the die by set screw 61 and may be slidable on a pin 62 secured to the holder 57. When the die rod has been properly adjusted a set screw 63 may be tightened to hold the die rod in fixed relation in the holder.

In addition to the foregoing adjustable nature of the die rod it is desirable to provide for a tilting thereof either in a vertical or in a horizontal plane. The holder 57 is, therefore, pivotally mounted in a saddle 64 by means of a pin 65. The saddle 64 is provided with a depending spindle 66 and is rotatable in an offset bearing 67. This bearing is secured to the bracket 45 upon which the lower driving roller 33 is mounted.

It will be evident that by reason of the pivoted mounting of the holder 57 on the pin 65, and by reason of the pivoted saddle 64 with the die rod holder, that the die may be moved or oscillated either in a vertical or horizontal plane.

The adjustment of the die rod holder to bring the cavity of the die in proper relation to the path of movement of the driven wire is a delicate and important operation, and owing to the fineness in degree and the necessary accuracy of the adjustment the movement of the die must be made in a positive and definite manner. Furthermore, since the adjustment is made manually the operative parts must be so arranged and co-related that an operator may be able to appreciate the movement of the die to the required position. Inasmuch as the actual variation of the die with the path of movement of the wire is often less than one thousandth part of an inch it would ordinarily be impossible for the operator to appreciate when such degree of movement had been produced.

In order to provide for and to facilitate an attainment of the exceptionally delicate movement of the die, the die rod holder 57 is provided with an extension in the form of an adjustment-control-arm 68, an end 69 of which is disposed for movement either in a horizontal or vertical direction in order to produce a corresponding directional movement of the die. The advantage of the extension 68 follows from the fact that the same may be given an appreciable movement, which movement, however, results in imparting an extremely small movement of the die.

Figure 11:
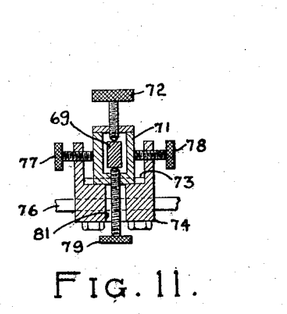
Fig. 11 is a sectional view taken on a vertical plane of the die adjusting head.

It will be understood therefore, that the position of the extension 68 may be manually controlled in convenient and positive manner and for this purpose an end 69 of the arm 68 is disposed in a retained guide 71 (Fig. 11) which is provided with a set screw 72 to limit the upward vertical movement of the end 69.

The guide 71 is movable laterally between guide plates or gibs 73 (see Figs. 3 and 11) provided on a slidable head 74. The said head is provided with a slot 75 for slidable engagement with an arcuate segment-plate 76 projecting from a stationary portion of the machine.

Set screws 77 and 78 extend through threaded apertures in side walls or lateral bosses provided on the head 74 and are adapted to make contact with the retainer guide to hold the same in an adjusted position.

The downward movement of the end 69 of the adjustment-control-arm 68 is regulated by a set screw 79 which extends through an enlarged aperture 81 in the head 74 and through a threaded aperture in the retained guide 71.

By reason of the above described construction it will be evident that a universal or compound adjustment of the die with respect to the driving rollers is made possible. If, therefore, a die is to be positioned to receive and coil a wire the proper relative position of the driving means and the die may readily be attained to produce a coil of a given predetermined diameter and pitch.

The above described mechanism illustrates a practical embodiment of a machine for carrying out the various steps to practice the present method of producing a coiled filamentary body of a predetermined diameter and pitch.

In attaining the proper winding, or coiling of a filament wire to produce a coiled filament of a given rating it has been found that certain steps or operations must be observed; and by a relative adjustment between the die and the moving wire a coiled filament answering the requirements set forth in the rating data may be obtained.

The construction giving the above result will be more readily understood by reference to the diagrammatic views of the drawing such as Figs. 12 to 20 inclusive together with the following description.

Ordinarily if a wire 41 is driven by driving rollers 33 and 39 in the direction of arrow "A", the wire will normally issue, owing to the construction of a die 52, in the form of a helix 40 having the convolutions spaced apart by the separating action of the lip 55 provided on the die. It will thus be evident that a coiled filament may be produced by means of the cavity die, and such coil may be considered as a normal result of the die and may answer the requirements of a light source and have operable dimensions as to diameter and pitch, but other conditions enter into the winding of a coil which make it essential to obtain a different predetermined diameter and pitch and it is therefore desirable to provide a method and machine whereby the diameter and pitch of a coiled filament may be governed and altered as desired. This is accomplished by a relative adjustment between the coil winding die and the path of travel of the wire to the die.

In order to more fully understand the importance of the said adjustment it may be explained that the tungsten wire from which the filaments are produced varies in its properties, for instance, one spool of wire may be slightly harder than another.

Usually a spool of wire is drawn from a given slug and during the process of manufacture it is found that owing to slight variations in the heating and cooling or by reason of the inherent nature of the material the wire on the resultant spools acts differently under the bending or coiling operation. If, therefore, a spool of wire is applied to the machine and coiled, the issuing coil for a given setting of the die will have a diameter and pitch depending upon the characteristics or properties of the particular wire employed. It is, therefore, desirable to provide a mode of not only coiling a wire and spacing the coils by means of a fixed spacer element such as the lip 55 of the die but to further provide a method whereby the diameter and pitch of a coil may be controlled either in conjunction with the lip or irrespective of the same.

Figure 12:
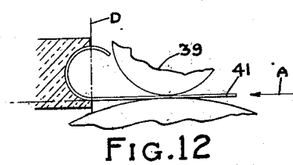
Fig. 12 shows relation of a die and the driving rollers to produce convolutions as normally formed by the die.
Figures 13, 14:
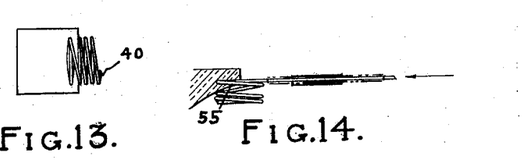
Fig. 13 is front view of the die as shown in Fig. 12.
Fig. 14 is a sectional view of the die shown in Fig. 12.

In accomplishing the above it has been found, as stated above, that when the wire 41 is directed into the die, as shown in Figs. 12 and 13, with the slot or cavity 54 thereof substantially in alignment with the path of movement of the wire the separator lip 55 will give the resultant convolutions a given spaced relation, and the diameter of the wire will be substantially the same as the curvature of the cavity.

Figures 16, 17:
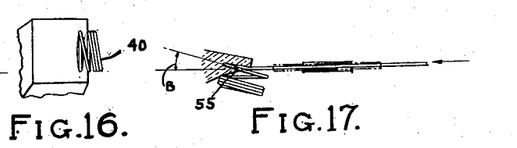
Fig. 16 is front view of the die and shows the same tilted to produce a closer relation to the convolutions than normally produced by the die.
Fig. 17 is a sectional view of the die shown in Fig. 16.

If it is desired to produce a helix with the convolutions thereof in closer relation or in contact, the die may be tipped slightly in the direction of the arrow "B" (see Figs. 16 and 17). If a greater spacing is desired between the convolutions of the helix the same may be obtained by tipping the die in the direction of the arrow "C" (see Figs. 19 and 20).

Figure 15:
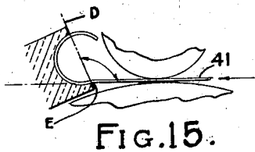
Fig. 15 shows the relation of the die to the path of movement of wire to produce convolutions of a larger diameter than normally produced by the die.

As to the diameter of the helix, it has been found that when the wire is driven tangentially into the curvature of the cavity, as in Fig. 12, and transverse to a diametric line D disposed at 90° to the path of movement of the wire the resultant convolutions will be normal or governed by the curvature of the cavity as shown in Fig. 12. If, however, a larger diameter of helix is desired the die may be positioned as shown in Fig. 15 so that the diametric line D is positioned at a greater angle than 90° with respect to the line of movement of the wire, thus giving the die what may be termed a plus position. A helix having a smaller diameter may be produced by moving the die away from the rollers to allow for a movement or tilting of the die and by giving the die what may be termed a negative position with the diametrical line D at a lesser degree of angular relation with respect to the line of movement of the wire as shown in Fig. 18.

From the foregoing it will be readily seen that in producing coils of larger size than normally formed by the die, the wire 41 is given a slight distortion in the form of a bend E as it enters the die. For the forming of smaller coils the wire is driven against the die in such manner that a slight compression or distortion occurs at F thus reducing the degree of bend with the result that convolutions of the issuing helix may be made smaller than would normally be produced.

It will be appreciated that by reason of the present method of manipulating or adjusting the die in one or more directions with respect to the path of travel of the wire that the dimensions of the coiled filamentary body as far as the diameter and pitch are concerned may be controlled within a relatively large range when compared with the narrow limits or dimensions under which the wire is worked.

It will be understood that the several views of the die above referred to which show the formation and relative positions of the wire are greatly exaggerated as to size and that in fact the die block employed usually has the exceedingly small surface dimension of .012 x .030 inches. This, of course, follows in accordance with the diameter of the extremely fine wire to be coiled.

It will be obvious that the present machine may be provided with suitably disposed calibrated scales so arranged that the die may be set by an adjustment of the movable operating parts in accordance with given positions on the scales to produce a coiled filamentary body of a predetermined pitch and diameter. For example, the adjustment-control-arm 68 might be provided with one or more pointers for indicating its degree of movement in one or more directions by the position of the pointers on suitably positioned scales. It would, of course, be necessary to practice the present invention in determining the calibrations for the respective indicating scales. Furthermore, as above set forth, the variation in the properties of different spools of wire such as tungsten would occasionally require a slight change in the relative positions of the coil winding elements, even when set by means of the scales, to compensate for the difference in the hardness, resiliency or other property of the wire as found in different spools.

The present machine provides various other features such as means for permitting the bearing plate 37 to be locked with the roller 39 in operative relation to the roller 33.

In the present construction the bearing plate carrying the driving roller 39 is, as above set forth, mounted to swing on the pin 42 away from the roller 33 to permit an inspection of the coil winding die and to aid in locating the same in proper relation to the said roller 39, and for the application or introduction of the wire to the die.

Figures 7, 8:
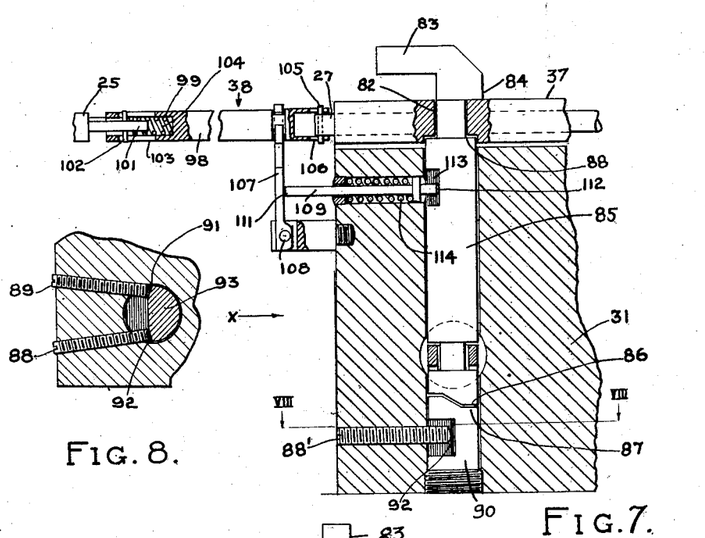
Fig. 7 is a fragmentary detail sectional view of mechanism employed for locking a bearing plate and for actuating a clutch.
Fig. 8 is a view taken on line VIII—VIII in Fig. 7.

The bearing plate 37 is so constructed that when in its lower position and the roller 39 is in its operative position with respect to the roller 33 the said plate may be locked. The plate is, therefore, provided with a slot 82 (Figs. 1 and 7) through which a locking member 83 projects when the bearing plate is in its lowered position; the locking member 83 is provided with an offset portion 84 to engage with the plate and retain the same in position. This engagement is effected by a rotation of the locking member 83 which is comprised of a spindle 85 extending through the bracket or casing 31; the spindle being provided with a cam surface 86 engageable with a cam surface 87 provided on a body 90 threadedly held in axial alignment with the spindle 85.

Adjacent to the upper end of the spindle 85 is a shoulder 88 to receive and serve as a stop for the bearing plate. As will be evident, when the spindle 85 is rotated 90° the offset portion 84 will disengage with the top of the bearing plate and the same will be free to move upwardly by reason of the slot 82. When the spindle 85 has been rotated, however, the action of the cam surfaces 86 and 87 will cause the spindle to be raised. This action will obviously prevent the bearing plate from being accidentally dropped and avoid injury by a detrimental impact between the upper and lower wire driving rollers.

As the spindle is turned, however, to lock the plate the action of the cam surfaces 86 and 87 permits a downward movement of the spindle so that when the said surfaces are in given relative position the upper roller 39 will be in proper relation to the lower roller.

It will be evident that the relative contacting positions of the cam surfaces 86 and 87 will determine the operative relation of the roller 39 with the roller 33. It is desirable, therefore, to provide for changing the contacting positions of the said cam surfaces and for this purpose a pair of set-screws 88' and 89 (Fig. 8) are provided to engage with flattened portions 91 and 92 on the body 90 of the cam member 87. The said cam body 90 may, therefore, be adjusted so as to change the relation of its cam surface 87 to the cam surface 86 of the spindle 85 to provide for the adjustment of the roller 39 in a given relation to the roller 33.

The spindle 85 is normally moved downwardly by reason of a pivoted member 94 having a forked end 95 disposed in an annular slot 96 provided in the spindle 85 and the member 94 is normally urged downwardly under the action of a spring 97, thus the cam surfaces 86 and 87 are retained in tensional engagement.

A rotation of the spindle 85 also operates to release the shaft 35 of the roller 39 from engagement with the driving shaft 25.

As above set forth a coupling member 38 is provided between the aforementioned shafts and may comprise a member 98, having an aperture 99 to receive an end 101 of the driving-shaft 25. This may be provided with a pin 102 movable in slots 103 and a spring 104 may be disposed between the pin and an end of the aperture 99 to urge the member 98 toward the shaft 27, which shaft may be provided with a pin 105 adapted to enter slots 106 in the member 98 so as to couple the shaft 25 with the shaft 27. The member 98 is, however, free to move from engagement with the shaft 27. This movement is effected by means comprising a lever arm 107 pivoted on a pin 108 in a bearing projecting from the bracket or casing 31. The lever 107 is actuated by a plunger 109 disposed with an end 111 in contact with the said lever. The opposite end 112 of the plunger is positioned so as to engage a flattened portion 113 of the spindle 85 when the coupling 38 is engaged with the shaft 27. A rotation of the spindle 85 will, therefore, result in an engagement with the end 112 of the plunger against the cylindrical surface of the spindle 85 with a consequent forward movement of the plunger to operate the lever 107 for disengaging the coupling 28 from the shaft 27. A spring 114 is positioned to normally maintain the plunger in contact with the spindle 85.

It will readily be seen that when the locking member 83 is rotated to permit the bearing plate 37 to move upwardly that the mechanism for releasing the shaft 27 is also actuated.

In connection with the present machine means are provided for measuring a given portion of the length of a wire to be wound and a cutting mechanism is provided for severing a section of coiled filaments containing a length of wire equal to that measured prior to the cutting operation.

Mechanism for performing the above operations is clearly described in the above mentioned copending application and need, therefore, only be dealt with herein in a more or less general manner.

The filament wire 41 may be led from the spools 47 around the measuring wheel 49 and thence between the rollers 33 and 39 which serve to drive the wire into the die 52. The wire may pass around the measuring wheel in one or more turns or in a single bight. The wire is thrust endwise into the cavity of the die 52 and is bent or coiled first in a direction reverse to its path of movement and thence by reason of the lip 55 is guided in a lateral direction so as to form a helix, the lip normally serving to separate the turns of the helix giving the same what may be termed a normal pitch, the convolutions of the helix also having a normal diameter in accordance with the curvature of the cavity 54 of the die. This pitch and diameter may, as above explained, be controlled by varying the relation of the die with respect to the path of movement of the wire in accordance with the present method.

Figure 1:
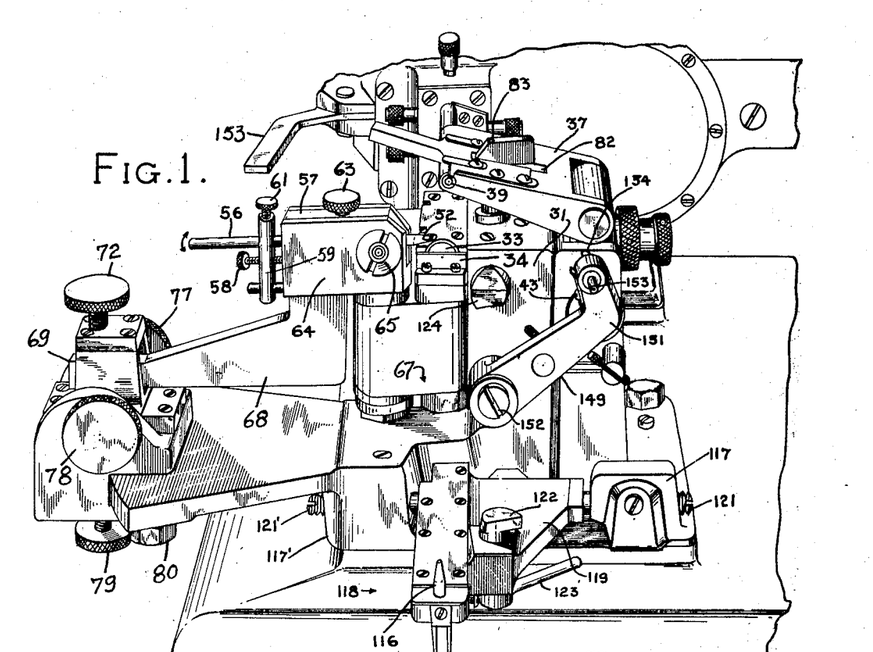
Fig. 1 is a perspective view of a portion of the machine embodying the present invention.

The wire 41 issues from the die in the form of the coil 40 and as the coil emerges it passes through a guide 116 (Fig. 23) carried at the upper end of a coil severing device 118. This device is comprised of an L-shaped member 119 supported in bearing brackets (Fig. 1) 117 and 117′ by means of set-screws 121 and 121′. The coil severing device being pivoted on the set screws 121 and 121′ may be oscillated so that the guide 116 is either in operative relation to the die 52 to receive the coiled wire or in position as shown in Fig. 1 to permit access to the die. When the coil severing device is in its operative position it is locked in place by means of a ward 122, which may be operated by a hand lever 123 to engage with a lug 124 secured to the casing 31.

When the coil severing device is in position so that the coiled wire passes through the guide 116 it is possible by reason of the set screws 121 and 121′ to slightly adjust the position of guide 116 with respect to the cavity die and it is possible by reason of this adjustment to attain slight variation in the pitch of the resultant coil.

The vertical arm 123 of the L-shaped member 119 which carries the guide 116 is provided with a cutter wheel 124 movable across an aperture 125 through which the coiled wire passes. The edge of this aperture in conjunction with the wheel 124 functions to sever the coiled filament after a predetermined section thereof has passed through the guide.

Mechanism for actuating the cutter includes a slide-bar 126 movable in a guide slot 127 in the long arm 123 of the member 119. A spring 128, disposed between a stop 129, secured to the arm and a threaded pin 131 acts to normally move the cutter away from the aperture 125.

Figures 9, 10:
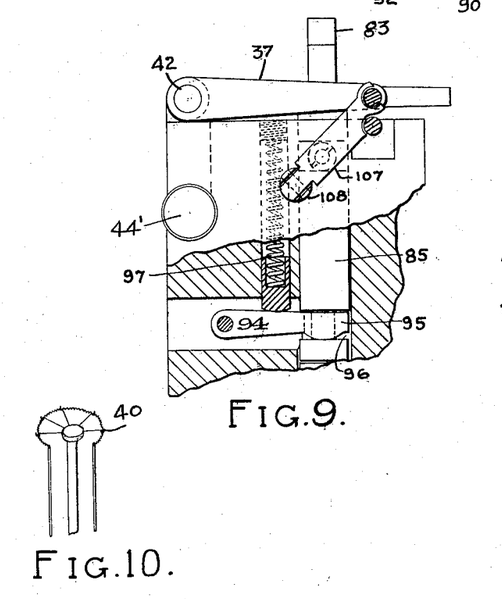
Fig. 9 is a side view of the mechanism shown in Fig. 7 looking in the direction of arrow X.
Fig. 10 illustrates a lamp stem having a coiled filament as produced by the present machine mounted thereon.

A slot 132 is provided in the slide-bar to permit a movement of the same so that when the pin 131 is engaged and forced upwardly the cutter will operate to sever a coiled section of filament of the proper length for use as a light source when mounted in a lamp stem as shown in Fig. 10. The action of the cutter is, however, controlled by the measuring roller 49 and mechanism for associating the cutter with the measuring roller may comprise a double arm lever 133 pivoted at 134 on a supporting plate 135 secured to the base 20 of the machine.

An arm 136 of the lever is adapted to make contact with the pin 131 of the cutter and an arm 137 of the lever is provided with a trigger member 138 normally held against a stop pin 139 on said arm by a spring 141. The lever 133 is arranged to cause an actuation of the cutter when a given length of wire has been coiled. For the purpose of operating the lever 133 at predetermined intervals, the measuring roller 49 is provided with a cam member 142 which engages a trigger-actuating-lever 143 pivoted at 144 on the bearing bracket 48 adjacent to the measuring-roller 49.

The cam 142 may be secured to the measuring roller so that a rotation thereof causes a rotation of the cam which moves an end 145 of the trigger actuating lever outwardly. Such movement of the lever 143 brings the lower end 146 thereof against the trigger member 138, causing it to move and to permit the said end to pass.

When the cam 142 makes a complete rotation and the end 145 of the lever 143 has reached the highest point on the cam a drop portion or depression 147 is provided, thus causing the end 145 of the lever 143 to move toward the measuring roller under the action of a spring 148. When such movement occurs the end 146 of the trigger-actuating-lever 143 engages the trigger 138 causing the lever 133 to rock and the arm 136 thereof to move upwardly and engage the pin 131 and actuate the cutter. The stop pin 139 allows the trigger member 138 relative movement in one direction only, thus when the trigger-actuating-member 143 is moved by the cam 142 the said member 143 will move the trigger member 138 in opposition to the springs 141 and 148 and the end 146 of the trigger actuating lever 143 will take a position on the opposite side of the trigger member. When the drop position 147 is reached the end 146 of the trigger-actuating-lever 143 will engage the trigger causing an actuation of the double arm lever 133 to actuate the cutter as above set forth and a continued rotation of the cam 142 will reset the actuating lever to repeat the above described operation.

It will be readily understood from the foregoing that the measuring roller may be of any given diameter so that upon a movement of a point in the wire a predetermined distance the cutter is actuated, and it will be obvious that the coil severed will have an amount of wire therein equal in length to the distance traveled by the given point in the wire prior to the cutting operation.

The present machine also includes a mechanism for facilitating the operation of initially applying the filament to the coil winding die. This mechanism which is termed a threading device is indicated by the numeral 149 (see Fig. 1) and includes a bent arm lever 151 pivoted at 152. The free end of the arm is provided with a rotatable pin 153, having an attenuated end 154 about which the wire is wound to produce several convolutions of a diameter equal to that to be produced by the coil winding die.

The arm 149 is movable to position the initially formed coils in position in the cavity of the die so that when the driving rollers operate the starting of the coiling operation will be more easily accomplished. This mechanism is clearly described in the above mentioned copending application and further description thereof is thought to be unnecessary herein.

In operating a machine to practice the present method the bearing plate 37 may be unlocked by a rotation of the locking member 83. This also results in an uncoupling of the shaft 27 with the driving shaft 25. The bearing plate may then be lifted to remove the roller 39 from the roller 33. The wire to be wound may then be led from the spool 47 around the measuring roller 49 and over the lower driving roller 33.

If the threading device is employed a number of coils may be made at the end of the wire by means of the pin 153 and applied to the cavity of the die and the pin 153 removed.

The bearing plate may then be lowered so that the roller 39 is disposed in operative relation to the roller 33 to grip and drive the wire into the die for the coiling operation.

When the bearing-plate 37 is lowered and locked the shaft 27 is automatically coupled with the driving shaft 25.

The adjustment of the die with respect to the path of movement of the wire may readily be attained by first adjusting the slidable head 74 to approximately the proper position. The head may then be secured in place by set screws 80. The die may then be adjusted by a relative movement in the holder 57 to position to receive the wire directly from the driving rollers. Inasmuch as no guide is employed to direct the wire from the rollers to the die it will be appreciated that a close relation of the die and rollers is essential. The die rod may then be secured from relative movement in the holder and further adjustment may be had by means of the set screws which control the position of the end 69 of the adjustment-control-arm 68 to change the position of the die holder and attain a finer adjustment of the die with relation to the path of movement of the wire. When a setting has been attained to produce a coiled filament and the machine is operated, the wire issues from the die in the form of a helix having what is termed a normal diameter and pitch. As the severed sections of such helix are discharged from the machine they are examined for a determination as to diameter and pitch. This inspection is, in the case of the winding of a lamp filament, made through the aid of a microscope.

The first coils made may, if desirable, be formed by rotating the driving rollers manually, for which purpose a hand-wheel 154 is provided so associated with the gearing in the gear box as to permit a rotation of the driving shafts 25 and 26 before power is applied. The driving shafts may be connected with the motor by means of a hand lever 153 which may operate any suitable form of clutch mechanism.

Assuming the coil to be wound is to be used as a filament for a 60 watt lamp it will, therefore, be necessary to have such coil formed in accordance with the rating data hereinbefore set forth. If it is found that a coil is formed having a diameter greater than that required, the necessary adjustments may be made to alter the relation of the die with the path of movement of the wire until coils of the proper diameter are produced.

If the pitch of the coil is not of the desired dimension the relation of the die with respect to the path of movement of the filament may be further adjusted so that a coil of the proper pitch is formed. Such adjustment may, as hereinbefore explained, be readily accomplished on the present machine and it will be appreciated that by reason of the present invention, a great accuracy and uniformity may be attained and coiled filamentary bodies may be produced to meet standard requirements laid down for a helically coiled wire for use in the performance of a given duty.

Although the description relating to the adjustment of the coil winding die with relation to the path of movement of the wire has been hereinbefore clearly described and is illustrated diagrammatically in Figs. 12 to 20 of the drawing, it will be appreciated that such description is merely an attempt to describe and delineate the performance of the wire upon a variation in the relative positions of the machine elements. The extremely fine caliber of the wire and the minute dimensions of the coil winding die, make it exceedingly difficult to accurately determine the precise action which occurs upon a change in the position of the die with respect to the path of movement of the wire. For example, with regard to the formation of convolutions of varying diameters, the die has been described as being inclined or tipped so as to produce helixes of different diameters. The effect of the tipping operation is, as explained, to obtain an initial distortion of the wire as it enters the die. It will be readily understood that the same effect may be had by moving the die toward or away from the driving rollers and by positioning the wire receiving edge of the die either slightly above or below the path of movement of the wire.

No matter what the conditions may be which govern the dimensions of the convolutions, such conditions are brought about by the present method which comprises a change in the relative positions of the die and the path of movement of the wire to produce convolutions of the desired diameters. The same is true with respect to the adjustment of the die to produce a variation in the pitch or spacing of the convolutions forming the resultant helix.

If the coil is to be made for use in connection with a precision or other instrument wherein it is necessary that a fine degree of accuracy is required the same may be produced by the present machine and such machine is particularly advantageous in connection with the production of a filamentary body as employed to constitute a light source for an incandescent electric lamp.

The present machine may be used in the winding of coils for many purposes the main idea being to be able to control pitch of a helix irrespective of the dimension of the coiled body produced by the normal operation of the machine.

Although a preferred embodiment of the invention is set forth and described herein it is to be understood that it is obvious to those schooled in the art that modifications may be made thereof which will fall within the spirit and scope of the appended claims.

What is claimed is:

1. A machine for forming a coiled filamentary body comprising a driving roller mounted on a spindle, a fixed bearing for said spindle, an adjustable bearing-plate, another roller having a spindle mounted in said bearing-plate and adapted to be positioned adjacent to said first mentioned rollers to provide a driving engagement with a wire tangent to said rollers, a die holder, a die in said holder, means for adjusting said die to and from said rollers, a pivoted saddle for said holder, a pivotal connection for said die-holder and said saddle, an adjustment-control-lever extending from said die-holder and means for adjusting and retaining said arm to position the die in a given relation to said rollers.

2. A machine for winding a wire to helical form comprising means for moving a wire through a predetermined path, a wire bending member disposed in close relation to said wire moving means, a holder for said member, an arm extending from said holder and means engageable with the free end of said arm for adjusting said holder with respect to said wire moving means.

3. A machine for winding a wire to helical form comprising means for moving a wire through a predetermined path, a wire bending member, a holder for said member, an arm extending from said holder and means for laterally and vertically engaging the free end of said arm to adjust said holder.

4. A machine for winding a wire to helical form comprising means for driving a wire in a predetermined path, a wire bending member, a holder for said member, means for pivotally supporting said holder for lateral movement and means for pivotally supporting said holder for vertical movement, an arm extending from said holder and means engageable the other end of said arm to adjust said holder with respect to said wire driving means.

5. A machine for producing a coiled filamentary body from a wire comprising means for moving a wire through a given path, a die member, a saddle for supporting said die member, a control arm for said saddle and means for adjusting said control arm to vary the position of said die with respect to the path of movement of said wire.

6. A machine for producing a coiled filamentary body from a wire comprising wire driving means for moving a wire through a given path, a die member, a saddle for supporting said die member adjacent to said wire driving means and means for pivotally supporting said saddle for lateral movement for adjusting said die with relation to said wire driving means.

7. A machine for producing a coiled filamentary body from a wire comprising a wire driving means for moving a wire through a given path, a die member, a saddle for supporting said die member and pivotal means for adjusting said saddle vertically and horizontally to vary the position of said die member with respect to said wire driving means.

8. A machine for coiling a wire comprising wire driving means, wire bending means disposed in operative relation to said wire driving means, a movable member, a pin rotatable in said member for receiving and coiling a wire to produce an initial helix therein and means for moving said member to dispose said initial helix adjacent to said wire bending member for a continuation of the initial helix.

9. A machine for coiling a wire comprising means for driving a wire through a predetermined path, a wire bending member, means for initially producing a coil in said wire, means for moving said last mentioned means to dispose said initially coiled wire in operative relation to said wire bending member, a guide for receiving coiled wire issuing from said die and means for removing said guide to facilitate the application of said initially coiled wire to said die.

10. A machine for producing a coiled filamentary body of a given pitch comprising wire driving means for moving a wire through a predetermined path, a die having a cavity positioned for receiving and coiling a wire, means to permit a relative adjustment of said wire driving means and said die so as to offset the die cavity with respect to the normal path of movement of the wire to give a predetermined spacing to the coiled filament, means for severing a section of said coiled wire and means for measuring a given portion of said wire prior to the severing operation to provide a coiled section containing a predetermined length of wire.

11. A machine having a cavity die for producing a coiled filamentary body comprising means for driving a wire through a given path, means for holding the die with the cavity thereof disposed to receive the wire to bend the same to helical form, means for adjusting the die with relation to the path of movement of the wire to vary the pitch of said helix, means for measuring a given section of wire and means for severing a section of said coiled wire containing a length of wire equal to the measured section.

12. A machine for winding a wire to helical form comprising a wire bending element, a pair of rotary members for driving a wire into said bending element and means for adjusting said element into close proximity with a vertical diametrical line of one of said rollers perpendicular to the longitudinal axis of said wire bending element to position the effective portion of said element to receive the wire immediately as it passes from between said rotary members.

13. A machine for winding a wire into helical form comprising a wire bending element, a wire coiling surface carried by said element, a pair of wire driving rollers, means for adjusting said element, said rollers being of different diameters to permit an adjustment of said element to position said surface in close proximity to a line passing through the axes of rotation of said rollers and perpendicular to the longitudinal axis of said element.

14. A machine for winding a wire into helical form comprising a wire bending element, a wire coiling surface carried by said element, a pair of wire driving rollers, means for adjusting said element, said rollers being of different diameters to permit an adjustment of said element to position said surface in close proximity to a line passing through the axes of rotation of said rollers and perpendicular to the longitudinal axis of said element and means for removing one of said rollers to facilitate an adjustment of said surface to receive said wire.

15. A machine for winding a wire into helical form comprising a wire bending element, a wire coiling surface carried by said element, a pair of wire driving rollers, means for adjusting said element, said rollers being of different diameters to permit an adjustment of said element to position said surface in close proximity to a line passing through the axes of rotation of said rollers and perpendicular to the longitudinal axis of said element, and means for rotating said rollers at equal peripheral speeds.

16. A machine for winding a wire into helical form comprising a wire bending element, a wire coiling surface carried by said element, a pair of wire driving rollers, means for adjusting said element, said rollers being of different diameters to permit an adjustment of said element to position said surface in close proximity to a line passing through the axes of rotation of said rollers and perpendicular to the longitudinal axis of said element, means for rotating said rollers at equal peripheral speeds and means for changing the relative positions of said driving rollers to facilitate an adjustment of said wire coiling surface.

In testimony whereof, I have hereunto subscribed my name this 18th day of October, 1926.

JOHN W. EKSTEDT.